(12) United States Patent
Wang

(10) Patent No.: US 10,579,837 B2
(45) Date of Patent: Mar. 3, 2020

(54) METHOD, DEVICE AND ELECTRONIC APPARATUS FOR TESTING CAPABILITY OF ANALYZING A TWO-DIMENSIONAL CODE

(71) Applicant: Zhuhai Juntian Electronic Technology Co., Ltd., Zhuhai, Guangdong (CN)

(72) Inventor: Chao Wang, Guangdong (CN)

(73) Assignee: Zhuhai Juntian Electronic Technology Co., Ltd., Zhuhai, Guangdong (CN)

( * ) Notice: Subject to any disclaimer, the term of this patent is extended or adjusted under 35 U.S.C. 154(b) by 0 days.

(21) Appl. No.: 16/034,135

(22) Filed: Jul. 12, 2018

(65) Prior Publication Data

US 2019/0197263 A1 Jun. 27, 2019

(30) Foreign Application Priority Data

Dec. 22, 2017 (CN) .......................... 2017 1 1427589

(51) Int. Cl.
*G06K 7/00* (2006.01)
*G06K 7/14* (2006.01)

(52) U.S. Cl.
CPC ......... *G06K 7/0095* (2013.01); *G06K 7/1417* (2013.01)

(58) Field of Classification Search
None
See application file for complete search history.

(56) References Cited

U.S. PATENT DOCUMENTS

2011/0073647 A1\* 3/2011 Chiou ................ G06K 7/10544
235/437

\* cited by examiner

*Primary Examiner* — Kristy A Haupt
(74) *Attorney, Agent, or Firm* — Wolf, Greenfield & Sacks, P.C.

(57) ABSTRACT

The embodiments of the present application disclose a method, a device and an electronic apparatus for testing capability of analyzing a two-dimensional code. The method comprises: performing an analysis on a two-dimensional code to be tested to obtain a result string; recording a duration of the present analysis; updating a total test duration based on the duration of the present analysis; determining whether the present analysis is correct; updating the number of correct analyses if the present analysis is correct; determining whether the updated total test duration is not less than a preset duration; determining a test result based on the updated number of correct analyses and the updated total test duration if the updated total test duration is not less than the preset duration, so as to intuitively reflect the capability of the electronic apparatus analyzing a two-dimensional code.

15 Claims, 4 Drawing Sheets

METHOD, DEVICE AND ELECTRONIC APPARATUS FOR TESTING CAPABILITY OF ANALYZING A TWO-DIMENSIONAL CODE

CROSS-REFERENCE TO RELATED APPLICATIONS

The present application claims the priority to a Chinese Patent Application No. 201711427589.3, filed with the Chinese Patent Office on Dec. 22, 2017 and entitled "METHOD, DEVICE AND ELECTRONIC APPARATUS FOR TESTING CAPABILITY OF ANALYZING A TWO-DIMENSIONAL CODE", which is incorporated herein by reference in its entirety.

TECHNICAL FIELD

The present application relates to the field of communications technology, and in particular, to a method, a device and an electronic apparatus for testing capability of analyzing a two-dimensional code.

BACKGROUND

The two-dimensional code, which represents a series of binary data by using a black and white rectangular pattern, is a very common readable bar code. After the two-dimensional code is analyzed by an electronic apparatus, a string represented by the black and white rectangular pattern can be obtained. The two-dimensional code may represent strings of different formats. In this way, the electronic apparatus can realize various functions such as opening a web page, payment, sending an e-mail, and sending a short message, etc. by analyzing the two-dimensional code.

Therefore, almost all electronic apparatuses have the capability to analyze two-dimensional codes. Based on this, manufacturers or users of the electronic apparatuses may need to understand an electronic apparatus's capability of analyzing a two-dimensional code. Therefore, how to test an electronic apparatus's capability of analyzing a two-dimensional code is an urgent problem to be solved.

SUMMARY

To this end, embodiments of the present application provide a method, a device and an electronic apparatus for testing capability of analyzing a two-dimensional code, which can obtain a test result for the capability of the electronic apparatus analyzing the two-dimensional code, so as to intuitively reflect the capability of the electronic apparatus analyzing the two-dimensional code.

According to a first aspect, an embodiment of the present application provides a method for testing capability of analyzing a two-dimensional code. The method comprises:
performing an analysis on a two-dimensional code to be tested to obtain a result string;
recording a duration of the present analysis;
updating a total test duration based on the duration of the present analysis;
determining whether the present analysis is correct;
updating the number of correct analyses if the present analysis is correct;
determining if the updated total test duration is not less than a preset duration;
determining a test result based on the updated number of correct analyses and the updated total test duration if the updated total test duration is not less than the preset duration.

In combination with the first aspect, in the first implementation of the first aspect, the method further comprises: generating a string to be tested based on a preset length; generating the two-dimensional code to be tested based on the string to be tested; wherein the test result is a test result for the preset length.

In combination with the first implementation of the first aspect, in the second implementation of the first aspect, determining whether the present analysis is correct, comprises: determining whether the result string is the same as the string to be tested; determining that the present analysis is correct if the result string is the same as the string to be tested.

In combination with the first implementation of the first aspect, in the third implementation of the first aspect, the method further comprises: updating the preset length to obtain test results for a plurality of different preset lengths; determining a test result of analyzing a two-dimensional code based on the test results for the plurality of different lengths.

In combination with the first aspect, in the fourth implementation of the first aspect, the method further comprises: updating the two-dimensional code to be tested if the updated total test duration is less than the preset duration; performing an analysis on the updated two-dimensional code to be tested.

According to a second aspect, an embodiment of the present application provides a device for testing capability of analyzing a two-dimensional code. The device comprises:
an analyzing unit, configured to perform an analysis on a two-dimensional code to be tested to obtain a result string;
a recording unit, configured to record a duration of the present analysis;
a first updating unit, configured to update a total test duration based on the duration of the present analysis;
a first judging unit, configured to determine whether the present analysis is correct;
a second updating unit, configured to update the number of correct analyses if the present analysis is correct;
a second judging unit, configured to determine whether the updated total test duration is not less than a preset duration;
a first determining unit, configured to determine a test result based on the updated number of correct analyses and the updated total test duration if the updated total test duration is not less than the preset duration.

In combination with the second aspect, in the first implementation of the second aspect, the device further comprises: a first generation unit, configured to generate a string to be tested based on a preset length; a second generation unit, configured to generate the two-dimensional code to be tested based on the string to be tested; wherein the test result is a test result for the preset length.

In combination with the first implementation of the second aspect, in the second implementation of the second aspect, the first judging unit is configured to: determine whether the result string is the same as the string to be tested, and determine that the present analysis is correct if the result string is the same as the string to be tested.

In combination with the first implementation of the second aspect, in the third implementation of the second aspect, the device further comprises: a third updating unit, configured to update the preset length to obtain test results for a plurality of different preset lengths; a second determining unit, configured to determine a test result of analyzing a two-dimensional code based on the test results for the plurality of different lengths.

In combination with the second aspect, in the fourth implementation of the second aspect, the device further comprises: a fourth updating unit, configured to update the two-dimensional code to be tested if the updated total test duration is less than the preset duration; the analyzing unit is further configured to perform an analysis on the updated two-dimensional code to be tested.

In a third aspect, an embodiment of the present application provides an electronic apparatus. The electronic apparatus comprises: a housing, a processor, a memory, a circuit board, and a power supply circuit; wherein the circuit board is arranged inside a space enclosed by the housing; the processor and the memory are arranged on the circuit board; the power supply circuit is configured to supply power to each circuit or component of the electronic apparatus; the memory is configured to store an executable program code; the processor is configured to implement a method for testing capability of analyzing a two-dimensional code in any one of the above implementation by reading the executable program code stored in the memory to execute a program corresponding to the executable program code.

The embodiments of the present application provide a method, a device and an electronic apparatus for testing capability of analyzing a two-dimensional code. The test of analyzing a two-dimensional code for the electronic apparatus can be performed. A test result is determined based on the total test duration of the test of analyzing the two-dimensional code and the number of correct analyses, so as to intuitively reflect the capability of the electronic apparatus analyzing a two-dimensional code.

BRIEF DESCRIPTION OF THE DRAWINGS

To describe the solutions of embodiments of the application or the prior art more clearly, the accompanying drawings to be used in the description of embodiments or the prior art will be described briefly below. Obviously, the accompanying drawings described below are merely for some embodiments of the application. Those with ordinary skills in the art can obtain other drawings based on these accompanying drawings without creative efforts.

DETAILED DESCRIPTION

The embodiments of the present application will be described in detail below with reference to the accompanying drawings.

It should be clear that the embodiments described are merely a part of the embodiments rather than all the embodiments of the present application. All other embodiments obtained by those skilled in the art based on the embodiments of the present application without creative efforts are within the scope of protection of the application.

Figure 1:
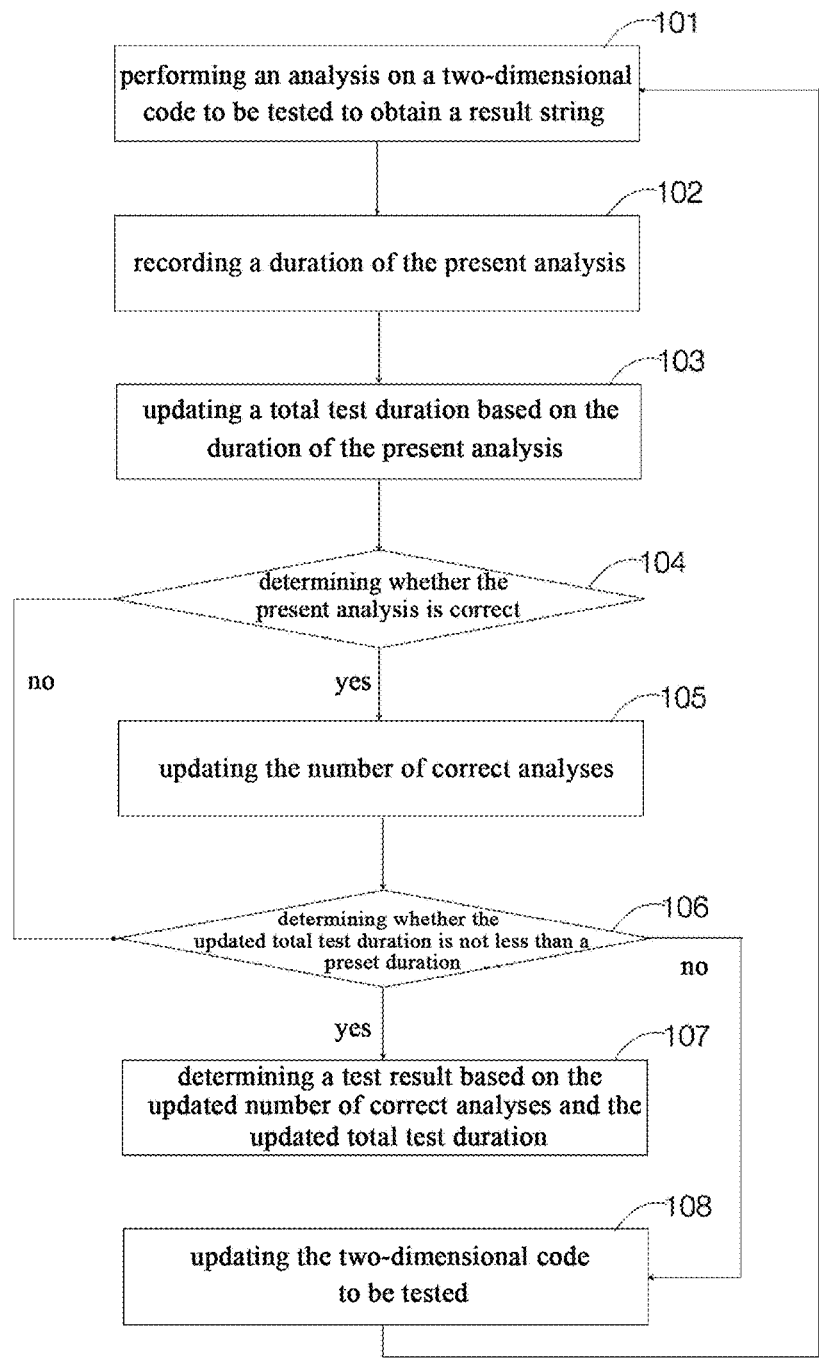
FIG. 1 is a schematic flowchart of a method for testing capability of analyzing a two-dimensional code provided by an embodiment of the present application.

FIG. 1 is a schematic flowchart of a method for testing capability of analyzing a two-dimensional code provided by an embodiment of the present application. The method for testing capability of analyzing a two-dimensional code can be applied to an electronic apparatus.

As shown in FIG. 1, the method provided by the present embodiment can comprises:

Step 101, performing an analysis on a two-dimensional code to be tested to obtain a result string.

Step 102, recording a duration of the present analysis.

Step 103, updating a total test duration based on the duration of the present analysis.

Wherein, the total test duration is the sum of all the durations, each of which is a duration used by the electronic apparatus to analyze each two-dimensional code.

Step 104, determining whether the present analysis is correct.

If the present analysis is correct, step 105 is performed; otherwise, step 106 is directly performed.

Step 105, updating the number of correct analyses.

Specifically, if the present analysis is correct, the number of correct analyses is increased by one; otherwise, the number of correct analyses will not be changed.

Step 106, determining whether the updated total test duration is not less than a preset duration.

If the updated total test duration is not less than the preset duration, step 107 is performed; otherwise, step 108 is performed.

Step 107: determining a test result based on the updated number of correct analyses and the updated total test duration.

In one example, a score obtained by dividing the total test duration by the number of correct analyses can be used as the test result. When taking the value of the score, the number of reserved digits can be taken according to demand. The more the number of digits is, the higher the accuracy is. A lower score shows a faster speed at which the electronic apparatus analyzes a two-dimensional code, and a better capability of analyzing a two-dimensional code.

Step 108, updating the two-dimensional code to be tested.

After the two-dimensional code to be tested is updated, step 101 is performed for the updated two-dimensional code to be tested, i.e., the updated two-dimensional code to be tested is analyzed to implement a method for testing capability of analyzing a two-dimensional code provided by the present embodiment, until the total test duration is not less than the preset duration.

By using the method for testing capability of analyzing a two-dimensional code provided by the embodiment of the present application, the electronic apparatus can test the capacity of analyzing a two-dimensional code. A test result is determined based on the total test duration of the test of analyzing the two-dimensional code and the number of correct analyses, so as to intuitively reflect the capability of the electronic apparatus analyzing a two-dimensional code.

In an embodiment of the present application, before the step 101, the method can further comprises:

generating a string to be tested based on a preset length, and generating the two-dimensional code to be tested in the step 101 based on the string to be tested.

Correspondingly, the test result obtained in the step 107 is the test result for the preset length.

It can be understood that updating the two-dimensional code to be tested in the step 108 may include: generating a new string to be tested based on a preset length, generating a new two-dimensional code to be tested based on the new string to be tested, and using the new two-dimensional code to be tested as the updated two-dimensional code to be tested.

Based on the string to be tested, in an embodiment of the present application, the step 104 of determining whether the present analysis is correct can comprise:

determining whether the result string obtained in the step 101 is the same as the string to be tested; if the result string obtained in the step 101 is the same as the string to be tested, determining that the present analysis is correct; otherwise, determining that the present analysis is not correct.

In an embodiment of the present application, different preset lengths can be set; the electronic apparatus is tested respectively for each preset length; and then the final test result of the electronic apparatus analyzing a two-dimensional code is obtained based on the test result for each preset length. Based on this, the method can further comprise:

updating the preset length to obtain test results for a plurality of different preset lengths; determining a test result of analyzing a two-dimensional code based on the test results for the plurality of different lengths.

Specifically, a weighted average of test results for a plurality of different preset lengths is calculated, and the weighted average is used as the test result of the electronic apparatus analyzing a two-dimensional code. The lower the weighted average, the faster the speed at which the electronic apparatus analyzes a two-dimensional code, and the better the capability of analyzing a two-dimensional code.

Wherein the weight of the test result for each preset length can be set based on the preset length. For example, the higher the probability that the electronic apparatus analyzes a two-dimensional code for a string of a certain length is, the greater the weight for the preset length is.

In addition, when taking the value of the weighted average, the number of reserved digits can be taken according to the demand. The more the number of digits is, the higher the accuracy is.

By using the method for testing capability of analyzing a two-dimensional code provided by the embodiment of the present application, a plurality of sets of two-dimensional code analysis tests can be performed on the electronic apparatus for two-dimensional codes for different lengths of the strings to be tested. Based on the number of correct analyses and the total test duration of each set of tests of analyzing a two-dimensional code, the test result of the set of tests of analyzing the two-dimensional code is determined. Then the weighted average of test results of a plurality of sets of tests of analyzing two-dimensional codes is used as the test result of the electronic apparatus analyzing the two-dimensional code, so as to intuitively reflect the capability of the electronic apparatus analyzing a two-dimensional code.

The following further describes the method for testing capability of analyzing a two-dimensional code provided by an embodiment of the present application through a specific example.

In the present embodiment, it is assumed that four sets of tests of analyzing two-dimensional codes are performed on the electronic apparatus X, and the electronic apparatus X itself implements the method for testing capability of analyzing a two-dimensional code provided by the present embodiment. Wherein, the length of the string for the first set of tests of analyzing a two-dimensional code is 24, the length of the string for the second set of tests of analyzing a two-dimensional code is 36, the length of the string for the third set of tests of analyzing a two-dimensional code is 48, and the length of the string for the fourth set of tests of analyzing a two-dimensional code is 64. In addition, a preset duration threshold L for each set of tests of analyzing a two-dimensional code is 700 milliseconds, and the corresponding weights are the same.

The first set of tests of analyzing a two-dimensional code will be described below as an example.

The electronic apparatus X randomly generates a string 1 with a length of 24, and generates a two-dimensional code 1 for the string 1. The timing starts when the electronic apparatus X starts analyzing the two-dimensional code 1, and the timing stops when the electronic apparatus X obtains the analysis result string 1', for the two-dimensional code 1. The timing duration is recorded as a duration D1 used by the electronic apparatus to analyze the two-dimensional code 1. It is assumed that D1 is 2.5 milliseconds. It is assumed that the electronic apparatus X determines that the string 1' is different from the string 1, the number C of correct analyses for the electronic apparatus X is the initial value 0.

Since the current electronic apparatus X only analyzes the two-dimensional code 1, i.e. D1 is the current total test duration T for the electronic apparatus X. Based on this, it can be seen that the current T is less than L. Therefore, the apparatus X randomly generates a string 2 with a length of 24, and generates a two-dimensional code 2 for the string 2. The timing starts when the electronic apparatus X starts analyzing the two-dimensional code 2, and the timing stops when the electronic apparatus X obtains the analysis result string 2', for the two-dimensional code 2. The timing duration is recorded as duration D2 used by the electronic apparatus to analyze the two-dimensional code 2. It is assumed that D2 is 2.6 milliseconds. It is assumed that the electronic apparatus X determines that the string 2' is the same as the string 2, the number C of correct analyses for the electronic apparatus X is increased by one, and C is 1 at this time.

Since the electronic apparatus X currently analyzes the two-dimensional code 1 and the two-dimensional code 2, the current total test duration T for the electronic apparatus X is equal to D1+D2=5.1 milliseconds. Based on this, it can be seen that the current T is less than L. Therefore, the apparatus X randomly generates a string 3 with a length of 24. The subsequent processes are similar to the processes of the electronic apparatus X analyzing the two-dimensional code 1 and the two-dimensional code 2, which will not be repeated here.

It is assumed that until the two-dimensional code 273 is analyzed, the total test duration T is equal to D1+D2+ . . . +D273. At present, it is assumed that T is equal to 702 milliseconds and T is not less than L. Therefore, for the first set of tests of the electronic apparatus X analyzing a two-dimensional code, the preliminary score Z1=T/C is obtained through calculation. It is assumed that C is 270, then the corresponding Z1 is 2.60000.

The processes of the second set, the third set and the fourth set of tests of analyzing a two-dimensional code are similar to the process of the first set of tests of analyzing a two-dimensional code, except that the generated strings are of respectively lengths. The specific processes are not repeated here. It is assumed that the preliminary score Z2 of the second set of tests of analyzing a two-dimensional code is 2.59993, the preliminary score Z3 of the third set of tests of analyzing a two-dimensional code is 2.60021, and the preliminary score Z4 of the fourth set of tests of analyzing a two-dimensional code is 2.63275.

Based on the preliminary scores and weights of the four sets of tests of analyzing of two-dimensional codes for the electronic apparatus X, the score Z of the capability of the electronic apparatus X analyzing a two-dimensional code can be obtained as $Z=(Z1+Z2+Z3+Z4)/4=2.6082225$.

Figure 2:
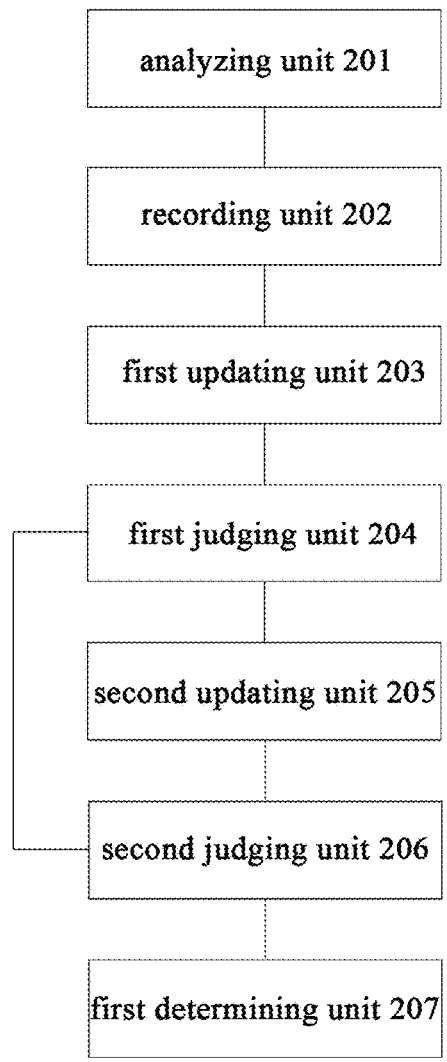
FIG. 2 is a schematic structural diagram of a device for testing capability of analyzing a two-dimensional code provided by an embodiment of the present application.

FIG. 2 is a schematic structural diagram of a device for testing capability of analyzing a two-dimensional code provided by an embodiment of the present application. The device can be applied to an electronic apparatus.

As shown in FIG. 2, the device provided by the present embodiment can comprise an analyzing unit 201, a recording unit 202, a first updating unit 203, a first judging unit 204, a second updating unit 205, a second judging unit 206, and a first determining unit 207.

Wherein the analyzing unit 201 is configured to perform an analysis on a two-dimensional code to be tested to obtain a result string.

The recording unit 202 is configured to record a duration of the present analysis.

The first updating unit 203 is configured to update a total test duration based on the duration of the present analysis.

The first judging unit 204 is configured to determine whether the present analysis is correct.

The second updating unit 205 is configured to update the number of correct analyses if the present analysis is correct.

The second judging unit 206 is configured to determine whether the updated total test duration is not less than a preset duration.

The first determining unit 207 is configured to determine a test result based on the updated number of correct analyses and the updated total test duration if the updated total test duration is not less than the preset duration.

Figure 3:
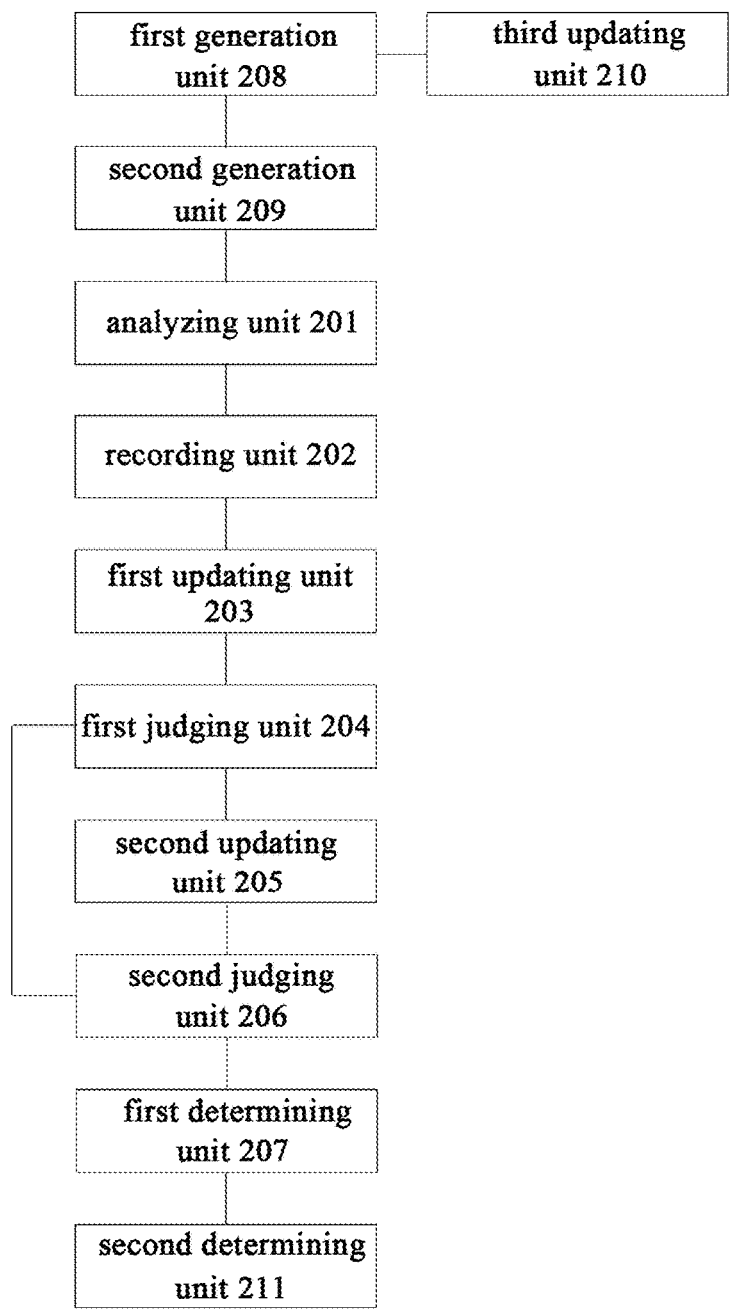
FIG. 3 is a schematic structural diagram of another device for testing capability of analyzing a two-dimensional code provided by an embodiment of the present application.

Preferably, FIG. 3 shows a schematic structural diagram of another device for testing capability of analyzing a two-dimensional code provided by an embodiment of the present application. The device further comprises: a first generation unit 208 and a second generation unit 209.

Wherein the first generation unit 208 is configured to generate a string to be tested based on a preset length.

The second generation unit 209 is configured to generate the two-dimensional code to be tested based on the string to be tested.

Correspondingly, the test result is a test result for the preset length.

Preferably, the first judging unit 204 is configured to determine whether the result string is the same as the string to be tested; if the result string is the same as the string to be tested, it is determined that the present analysis is correct.

As shown in FIG. 3, the device further comprises: a third updating unit 210 and a second determining unit 211.

Wherein the third updating unit 210 is configured to update the preset length to obtain test results for a plurality of different preset lengths.

The second determining unit 211 is configured to determine a test result of analyzing a two-dimensional code based on the test results for the plurality of different lengths.

Figure 4:
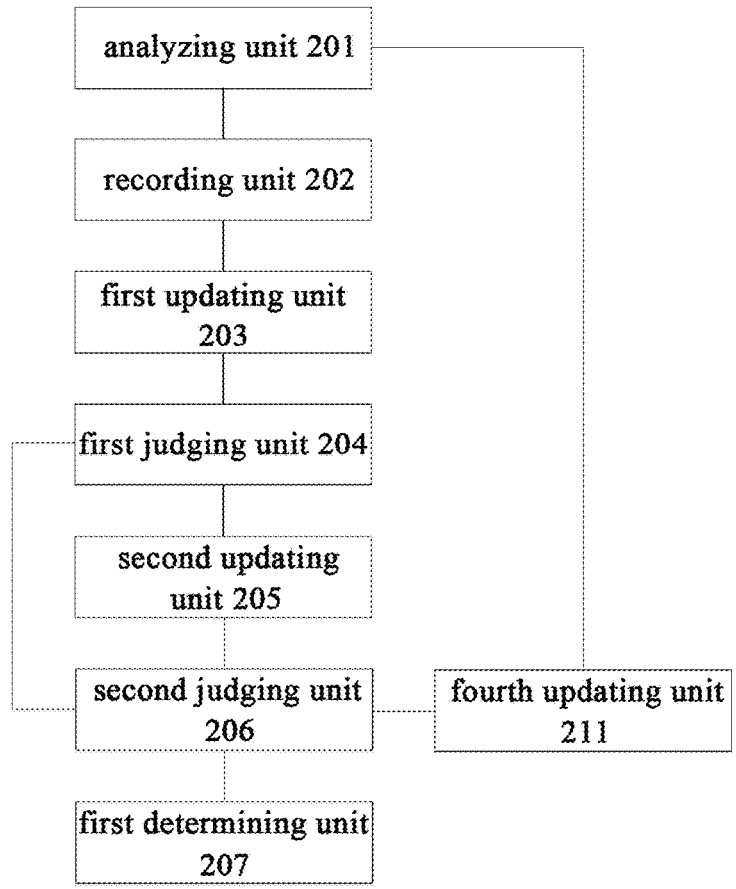
FIG. 4 is a schematic structural diagram of another device for testing capability of analyzing a two-dimensional code provided by an embodiment of the present application.

Preferably, FIG. 4 shows a schematic structural diagram of another device for testing capability of analyzing a two-dimensional code provided by an embodiment of the present application. The device further comprises: a fourth updating unit 212.

The fourth updating unit 212 is configured to update the two-dimensional code to be tested if the updated total test duration is less than the preset duration.

Correspondingly, the analyzing unit 201 is further configured to perform analysis on the updated two-dimensional code to be tested.

By using the device for testing capability of analyzing a two-dimensional code provided by an embodiment of the present application, the test of analyzing a two-dimensional code for the electronic apparatus can be performed. A test result is determined based on the total test duration of the test of analyzing the two-dimensional code and the number of correct analyses, so as to intuitively reflect the capability of the electronic apparatus analyzing a two-dimensional code.

Figure 5:
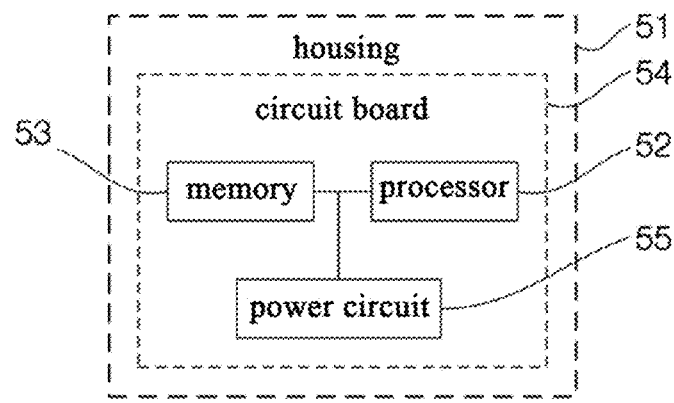
FIG. 5 is a schematic structural diagram of an electronic apparatus provided by an embodiment of the present application.

An embodiment of the application further provides an electronic apparatus. FIG. 5 is a schematic structural diagram of an electronic apparatus provided by an embodiment of the present application, the electronic apparatus can implement the process of the embodiment shown in FIG. 1 of the present application. As shown in FIG. 5, the above electronic apparatus can comprise a housing 51, a processor 52, a memory 53, a circuit board 54, and a power supply circuit 55, wherein the circuit board 54 is arranged inside a space enclosed by the housing 51; the processor 52 and the memory 53 are arranged on the circuit board 54; the power supply circuit 55 is configured to supply power to each circuit or component of the electronic apparatus; the memory 53 is configured to store an executable program code; the processor 52 is configured to implement the method for testing capability of analyzing a two-dimensional code provided by any of the above embodiments by reading the executable program code stored in the memory to run a program corresponding to the executable program code.

The electronic apparatus exists in various forms including but not limited to:

(1) a mobile communication apparatus: this type of apparatus is characterized by having mobile communication functions, with main purposes of providing voice and data communications. Such terminals include: smart phones (e.g., iPhone), multimedia phones, functional phones, low-end phones, and the like.

(2) an ultra-mobile personal computer apparatus: this type of apparatus belongs to the category of personal computers, has computing and processing functions and generally has mobile Internet access. Such terminals include: PDA, MID, UMPC (e.g., iPad) apparatuses and the like.

(3) a portable entertainment apparatus: this type of apparatus can display and play multimedia content. Such apparatuses include: audio and video play module (e.g., iPod), handheld game console, ebooks, and smart toys and portable onboard navigation apparatuses.

(4) a server that is an apparatus providing computing services, and the server comprises a processor, a hard disk, a memory, a system bus and the like. The architecture of the server is similar to that of a general computer. However, due to the need to provide highly reliable services, requirements for processing capacity, stability, reliability, security, expandability, manageability and the like are high.

(5) other electronic apparatuses with data interaction functions.

It should be noted that the relationship terms herein, such as "first", "second", and the like are only configured to distinguish one entity or operation from another entity or operation, but do not necessarily require or imply that there is actual relationship or order between these entities or operations. Moreover, the terms "include", "comprise", or any variants thereof are intended to cover a non-exclusive inclusion, such that processes, methods, articles, or devices, including a series of elements, include not only those elements listed, but also other elements not specifically listed or the elements intrinsic to these processes, methods, articles, or devices. Without further limitations, elements limited by the wording "comprise(s) a/an . . . " do not exclude additional identical elements in the processes, methods, articles, or devices, including the listed elements.

Various embodiments in the description are all described in a correlated manner, and references to each other can be made for the same or similar parts between various embodiments. In addition, the description for each embodiment focuses on the differences between them. In particular, the embodiment of the device is described briefly, since it is substantially similar to the embodiment of the method, and for the related contents, references can be made to the description of the embodiment of the method.

For the convenience of description, the above device is described in such a manner that individual units/modules divided according to functions are described respectively. Of course, the functions of the individual units/modules can be implemented in one or more software and/or hardware when implementing the present application.

It could be understood by those with ordinary skills in the art that the all or a part of the processes of the methods described above can be implemented by a computer program instructing related hardware, and the program can be stored in a computer-readable storage medium. When the program is executed, the process of each embodiment of a method described above can be implemented. Wherein the storage medium can be a magnetic disk, an optical disk, a Read-Only Memory (ROM), or Random Access Memory (RAM) and the like.

The above descriptions are only specific implementations of the present application, and the protection scope of the present application is not limited thereto. Any alteration or substitution that can be easily conceived by those skilled in the art within the technical scope disclosed by the present application shall fall within the protection scope of the present application. Therefore, The protection scope of the present application shall be determined by the protection scope of the claims.

The invention claimed is:

1. A method for testing capability of analyzing a two-dimensional code, comprising:
    performing an analysis on a two-dimensional code to be tested to obtain a result string;
    recording a duration of the present analysis;
    updating a total test duration based on the duration of the present analysis;
    determining whether the present analysis is correct;
    updating the number of correct analyses if the present analysis is correct;
    determining whether the updated total test duration is not less than a preset duration;
    determining a test result based on the updated number of correct analyses and the updated total test duration if the updated total test duration is not less than the preset duration.

2. The method of claim 1, wherein the method further comprises:
    generating a string to be tested based on a preset length;
    generating the two-dimensional code to be tested based on the string to be tested;
    wherein the test result is a test result for the preset length.

3. The method of claim 2, wherein determining whether the present analysis is correct, comprises:
    determining whether the result string is the same as the string to be tested;
    determining that the present analysis is correct if the result string is the same as the string to be tested.

4. The method of claim 2, wherein the method further comprises:
    updating the preset length to obtain test results for a plurality of different preset lengths;
    determining a test result of analyzing a two-dimensional code based on the test results for the plurality of different lengths.

5. The method of claim 1, wherein the method further comprises:
    updating the two-dimensional code to be tested if the updated total test duration is less than the preset duration; performing an analysis on the updated two-dimensional code to be tested.

6. A device for testing capability of analyzing a two-dimensional code, comprising:
    an analyzing unit, configured to perform an analysis on a two-dimensional code to be tested to obtain a result string;
    a recording unit, configured to record a duration of the present analysis;
    a first updating unit, configured to update a total test duration based on the duration of the present analysis;
    a first judging unit, configured to determine whether the present analysis is correct;
    a second updating unit, configured to update the number of correct analyses if the present analysis is correct;
    a second judging unit, configured to determine whether the updated total test duration is not less than a preset duration;
    a first determining unit, configured to determine a test result based on the updated number of correct analyses and the updated total test duration if the updated total test duration is not less than the preset duration.

7. The device of claim 6, wherein the device further comprises:
    a first generation unit, configured to generate a string to be tested based on a preset length;
    a second generation unit, configured to generate the two-dimensional code to be tested based on the string to be tested;
    wherein the test result is a test result for the preset length.

8. The device of claim 7, wherein the first judging unit is configured to:
    determine whether the result string is the same as the string to be tested;
    determine that the present analysis is correct if the result string is the same as the string to be tested.

9. The device of claim 7, wherein the device further comprises:
    a third updating unit, configured to update the preset length to obtain test results for a plurality of different preset lengths;
    a second determining unit, configured to determine a test result of analyzing a two-dimensional code based on the test results for the plurality of different lengths.

10. The device of claim 6, wherein the device further comprises:
    a fourth updating unit, configured to update the two-dimensional code to be tested if the updated total test duration is less than the preset duration;
    the analyzing unit is further configured to perform an analysis on the updated two-dimensional code to be tested.

11. An electronic apparatus, comprising: a housing, a processor, a memory, a circuit board, and a power supply circuit; wherein the circuit board is arranged inside a space enclosed by the housing; the processor and the memory are arranged on the circuit board; the power supply circuit is configured to supply power to each circuit or component of the electronic apparatus; the memory is configured to store an executable program code; by reading the executable program code stored in the memory to execute a program corresponding to the executable program code, the processor is configured to implement operations, comprising:

performing an analysis on a two-dimensional code to be tested to obtain a result string;
 recording a duration of the present analysis;
 updating a total test duration based on the duration of the present analysis;
 determining whether the present analysis is correct;
 updating the number of correct analyses if the present analysis is correct;
 determining whether the updated total test duration is not less than a preset duration;
 determining a test result based on the updated number of correct analyses and the updated total test duration if the updated total test duration is not less than the preset duration.

12. The electronic apparatus of claim 11, by reading the executable program code stored in the memory to execute a program corresponding to the executable program code, the processor is configured to implement operations, further comprising:

generating a string to be tested based on a preset length;
 generating the two-dimensional code to be tested based on the string to be tested;
 wherein the test result is a test result for the preset length.

13. The electronic apparatus of claim 12, wherein determining whether the present analysis is correct, comprises:

determining whether the result string is the same as the string to be tested;
 determining that the present analysis is correct if the result string is the same as the string to be tested.

14. The electronic apparatus of claim 12, by reading the executable program code stored in the memory to execute a program corresponding to the executable program code, the processor is configured to implement operations, further comprising:

updating the preset length to obtain test results for a plurality of different preset lengths;
 determining a test result of analyzing a two-dimensional code based on the test results for the plurality of different lengths.

15. The electronic apparatus of claim 11, by reading the executable program code stored in the memory to execute a program corresponding to the executable program code, the processor is configured to implement operations, further comprising:

updating the two-dimensional code to be tested if the updated total test duration is less than the preset duration; performing an analysis on the updated two-dimensional code to be tested.

\* \* \* \* \*